United States Patent Office 3,299,257
Patented Jan. 17, 1967

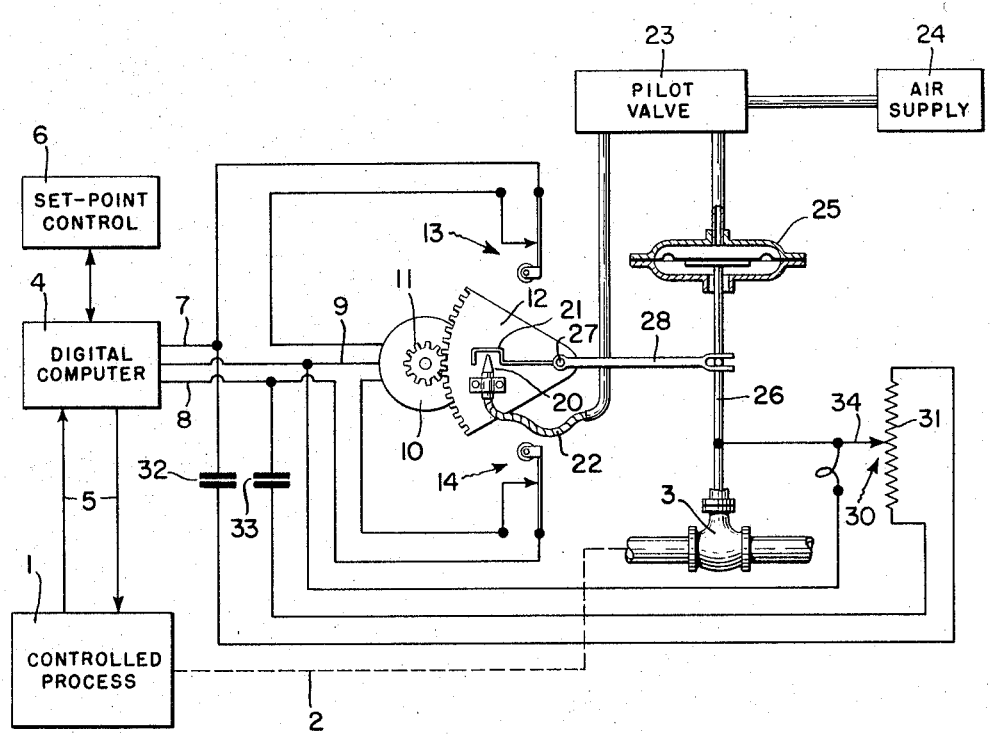

3,299,257
ELECTRICAL APPARATUS
Geert H. Bouman, Glenside, Pa., assignor to Honeywell Inc., a corporation of Delaware
Filed Mar. 29, 1963, Ser. No. 269,005
9 Claims. (Cl. 235—151.34)

This invention relates to valves. More specifically, the present invention relates to digital signal responsive valves.

An object of the present invention is to provide an improved digital signal responsive valve directly operable by a digital computer.

Still another object of the present invention is to provide a digital to analog transducer for positioning a movable element.

Another object of the present invention is to provide a digitally responsive valve having integral means for checking the position of the valve and means for preventing excessive motion of the valve.

A further object of the present invention is to provide a digitally responsive valve, as set forth herein, having a simple operation and construction.

In accomplishing these and other objects, there has been provided, in accordance with the present invention, a digitally responsive valve having a stepping motor having a characterized response to positive and negative digital signals. The stepping motor is effective to vary the operative relationship between a flapper and a nozzle whereby to change an energizing pressure for a valve operator. The valve operator is arranged to respond to the change in pressure by operating a valve. The motion of the valve is communicated to the flapper and nozzle to restore a balanced pressure at the valve operator to establish a new position of the valve until the next step of the stepping motor. The position of the valve may be sensed by potentiometer means having a wiper driven by the valve operator to vary the resistance at the wiper.

A better understanding of the present invention may be had from the following detailed description when read in connection with the accompanying drawing in which the single figure is a pictorial representation of a digitally responsive valve apparatus embodying the present invention.

Referring to the single figure drawing in more detail, there is shown a digital signal responsive valve device embodying the present invention. A controlled process 1 is shown having a fluid line 2 connected thereto with a valve 3 interposed in the fluid line. A digital computer 4 is interconnected to the process 1 along connecting lines 5 to compare a condition of the process 1; e.g., temperature, with a set-point signal, representative of a desired level of the condition supplied by a set-point control 6.

An output signal from the computer 4 is selectively applied along a desired one of a pair of control lines 7 and 8, having a common return line 9, to a stepping motor 10. A gear 11 is attached to the rotating armature of the motor 10 and is arranged to drive a gear sector 12. A limit switch 13 may be positioned with relation to the sector 12 to be operated by the effect of a clockwise movement of the sector 12 to an extreme position which position is effective to bring the sector 12 in contact with the switch 13. The operation of the switch 13 by the sector 12 is effective to open the line 7 to prevent the motor 10 from further driving the sector 12 in the clockwise direction which resulted in the operation of the switch 13. Similarly, a switch 14 is positioned with relation to the sector 12 to be operated by the effect of a counter-clockwise movement of the sector 12 to an extreme position. This operation of the switch 14 is effective to open motor line 8 to stop any further counter-clockwise movement of the sector 12 by the motor 10.

A nozzle 20 is carried by the sector 12 and is arranged to cooperate with a flapper 21 to control the effective opening of the nozzle 20. The nozzle 20 is connected by a flexible line 22 to a pilot valve 23. An air supply 24 is used to supply a driving fluid for operating the pilot valve 23. The effect of the supply 24 upon the valve 23 is controlled by the effective opening of the nozzle 20. Thus, the fluid supplied by the supply 24 is bypassed around the valve 23 to regulate the movement of the pilot valve 23. The pilot valve 23, in turn, is used to control the supply of the driving fluid from the supply 24 to a main valve operator 25 which is used to directly adjust the line valve 3 by means of a valve stem 26. The flapper 21 is pivoted at pivot point 27 which may be the pivot of sector 12. The movement of the flapper 21 around the pivot 27 is controlled by a rod 28 which is attached between the flapper 21 and the valve stem 26.

A potentiometer 30 is connected with its resistance winding 31 bridging wires 7 and 8 through capacitors 32 and 33, respectively. A slider 34 of the potentiometer 30 is electrically connected directly to the common line 9 and is mechanically responsive to the motion of the valve stem 26 to move therewith across the resistance winding 31.

In operation, the present invention is operative to regulate the opening of the valve 3 in response to the digital output signals from the computer 4. The digital signals from the computer 4 are applied along either line 7 or line 8 with line 9 serving as a common return. These digital signals are representative of the results of the computations performed by the computer 4 in response to the sensed condition of the process and the signals supplied by the control apparatus 6. Thus, the regulation of the valve 3 is effective to control the process 1 by the computer 4. The digital signals applied along lines 7 and 8 are of opposite polarity; a.g., positive signals are applied on line 7 and negative signals are applied on line 8. These digital signals are arranged to have corresponding effects on the reversible motor 10; i.e., the positive signals drive the motor 10 in an opposite direction from that produced by the negative signals.

Assume the positive signals are effective to drive the motor 10 and the sector 12 to move the nozzle 20 closer to the flapper 21 and the negative signals are effective to separate the nozzle 20 from the flapper 21. The movement of the flapper 21 toward the nozzle 20 produced by positive signals is effective to increase the back pressure in the line 22. This pressure increase is applied to the pilot valve 23 where it is effective to increase the pressure applied to the valve operator 25. An increase in the pressure applied to the operator 25 is operative to close the valve 3 by means of the valve stem 26; i.e., the valve stem 26 is moved in a direction toward the valve 3. This movement of the stem 26 is communicated to the flapper 21 by the rod 28 and is effective to separate the flapper 21 from the nozzle 20. The separation of the flapper 21 from the nozzle is operative to restore the former lower, or balanced, pressure in the line 22 and terminate any further movement of the valve stem 26. It is to be noted that this lower pressure is arranged to balance the mechanical resiliency of the valve operator 25 and valve 3, which resiliency may be aided by bias springs, not shown, to retain the valve 3 in a preset condition.

The movement of the valve stem 26 is also effective to move the wiper 34 on the resistance element 31. The position of the wiper 34 is communicated to the computer 4 by the application of an A.C. signal through the capacitors 32, 33 connected to the lines 7 and 8. The wiper 34 is connected to the return line 9 whereby the resistance of the winding 31 is divided between line 9 and each of the lines 7 and 8 in proportion to the movement of the slider 34. This A.C. signal is arranged to be ineffective to drive the stepping motor 10. Thus, the valve 3 is closed by the computer 4 to a desired position by digital signals applied by the computer 4 in accordance with the computer's calculations, and the position is checked by use of the potentiometer 30.

Conversely, the valve 3 may be opened by the application of negative signals along line 8 to the motor 10. These signals are effective to rotate the motor 10 in a direction opposite to that produced by the positive signals. This rotation is operative to open the gap between the flapper 21 and the nozzle 20 whereby to decrease the pressure in the line 22. This decrease in pressure is effective to affect the operator 25 to move the valve stem 26 in an upward direction; i.e., to open the valve 3. The upward movement of the stem 26 is applied through the rod 28 to unite the flapper 21 and the nozzle 20 whereby to restore the balanced lower pressure and stop the movement of the valve stem 26 by the operator 25. As previously discussed, the limit switches 13 and 14 are used to open the lines 7 and 8, respectively, whereby to stop the application of the computer digital output signals to the motor 10 when the sector 12 has reached a desired limit in its motion. For example, the positive pulses are effective to drive the sector 12 until switch 13 is opened, and the negative pulses are similarly made ineffective by the opening of switch 14.

Thus, it may be seen that there has been provided in accordance with the present invention, a digitally responsive valve which is positioned by digital signals applied directly from a digital computer and having a means for checking the position of the valve.

What is claimed is:

1. A digitally responsive valve comprising a valve means, a primary valve operator operative to adjust said valve means, a secondary pilot valve operative to control an energizing fluid supply to said valve operator, and digitally responsive means operative to control an energizing fluid supply to said pilot valve, said responsive means including a reversible stepping motor arranged to produce incremental motion in response to digital signals, a support means driven by said motor between spatial positions and a nozzle and flapper combination arranged to bypass a fluid supply for said pilot valve in proportion to their mutual separation, said combination having one element attached to said support means and the other element attached to said valve means whereby the motion of said support means produced by said stepping motor is offset by the motion of said valve means.

2. A digitally responsive valve comprising a valve means, a valve operator operative to adjust said valve means and digitally responsive means operative to control an energizing fluid supply to said valve means, said responsive means including a reversible stepping motor arranged to produce incremental motion in response to digital signals, a support means driven by said motor between spatial positions and a nozzle and flapper combination arranged to bypass a fluid supply for said pilot valve in proportion to their mutual separation, said combination having one element attached to said support means and the other element attached to said valve means whereby the motion of said support means produced by said stepping motor is offset by the motion of said valve means.

3. A digitally responsive positioner comprising a positionable element, an element operator operative to adjust said element and digitally responsive means operative to control an energizing fluid supply to said operator, said responsive means including a reversible stepping motor arranged to produce incremental motion in response to digital signals, a support means driven by said motor between spatial positions, and a nozzle and flapper combination arranged to bypass an energizing fluid supply for said operator in proportion to their mutual separation, said nozzle and flapper combination having one element attached to said support means and the other element attached to said element whereby the motion of said support means produced by said stepping motor is offset by the motion of said element.

4. A digitally responsive positioner comprising a positionable element, an element operator operative to adjust said element, digital responsive means operative to produce incremental motion in response to digital signals, a support means driven by said responsive means between spatial positions and a bypass means operative to bypass an energizing signal for said element operator to control the activity of said element operator, said bypass means having cooperating elements arranged to affect the bypass of said energizing signal in proportion to their mutual separation, said elements being driven respectively by said responsive means and said positionable element whereby the effect on the bypass of said energizing signal induced by said responsive means is offset by a motion of said positionable element.

5. A digital to analog transducer comprising an analog quantity producing positionable element, an element operator operative to adjust said element to produce said analog quantity, digital responsive means operative to produce incremental motion in response to digital signals, a support means driven by said responsive means between spatial positions and a bypass means operative to bypass an energizing signal for said element operator to control the activity of said element operator, said bypass means having cooperating elements arranged to affect the bypass of said energizing signal in proportion to their mutual separation, said elements being driven respectively by said responsive means and said positionable element whereby the effect on the bypass of said energizing signal induced by said responsive means is offset by a motion of said positionable element.

6. A process control system comprising a digital computer, sensing means associated with said process to produce signals indicative of the state of said process, circuit means operative to apply said signals as input signals to said computer, said computer executing mathematical computations upon said input signals to produce at least one digital output signal, a positionable element, an element operator operative to adjust said element, digital signal responsive means connected to said digital signals and operative to produce incremental motion in response to said digital signals, and a bypass means operative to bypass an energizing signal for said element operator to control the activity of said element operator, said bypass means having cooperating elements arranged to affect the bypass of said energizing signal in proportion to their mutual separation, said elements being driven respectively by said responsive means and said positionable element whereby the effect on the bypass of said energizing signal induced by said responsive means is offset by a motion of said positionable element.

7. A process control system comprising a digital computer, sensing means associated with a process to produce signals indicative of the state of said process, circuit means operative to apply said signals as input signals to said computer, said computer having a stored program for executing mathematical computations upon said input signals to produce at least one digital output signal comprising a series of incremental electrical pulses, an electric stepping motor connected to said computer and responsive to said pulses to produce incremental motion in response thereto, support means positioned by the motion of said motor, a fluid line connected to said process, valve means in said fluid line for controlling fluid flow therein in accordance with the position of said valve means, a valve operator operative to adjust the position of said valve means, and means for causing the adjusted position of said valve means to follow the adjusted position of said support means, including a first element driven by said support means, a second element driven by said valve means, and secondary means responsive to the relative position of said elements and operative to control the operation of said valve operator to maintain a predetermined relative position of said elements.

8. A system as specified in claim 7, wherein said elements are a flapper and nozzle combination, and wherein said secondary means includes valve means arranged to control the supply of a fluid to said valve operator in accordance with the relative position of said flapper and nozzle.

9. A system as specified in claim 8, including checking means responsive to the adjusted position of said valve means for applying to said digital computer a signal representative of the last mentioned position.

References Cited by the Examiner
UNITED STATES PATENTS 3,081,942  3/1963  Maclay _____ 340—347

MALCOLM A. MORRISON, *Primary Examiner.*

A. J. SARLI, *Assistant Examiner.*